United States Patent [19]
Shepherd et al.

[11] Patent Number: 5,192,119
[45] Date of Patent: Mar. 9, 1993

[54] PROTECTIVE COVER FOR EMPLY/LOAD VALVE ACTUATOR

[75] Inventors: Robert Shepherd, Hamburg; Neal Dauber, Hopatcong, both of N.J.

[73] Assignee: Ellcon National, Inc., Greenville, S.C.

[21] Appl. No.: 605,681

[22] Filed: Oct. 30, 1990

Related U.S. Application Data

[63] Continuation-in-part of Ser. No. 452,279, Dec. 15, 1989, Pat. No. 5,039,174.

[51] Int. Cl.$^5$ ................................ B60T 8/22
[52] U.S. Cl. .................... 303/22.8; 303/22.7
[58] Field of Search .................. 303/22.2–22.4, 303/22.6–22.8; 137/377; 251/285, 286

[56] References Cited

U.S. PATENT DOCUMENTS

| | | | |
|---|---|---|---|
| 2,588,961 | 3/1952 | Carlson et al. | 251/285 |
| 3,314,444 | 4/1967 | White | 137/377 |
| 3,404,922 | 10/1968 | Valentine | 303/22.8 X |
| 3,927,916 | 2/1975 | Masuda | 303/22.8 |
| 4,801,179 | 1/1989 | Hintner | 303/22.6 X |

FOREIGN PATENT DOCUMENTS

| | | | |
|---|---|---|---|
| 3209247 | 10/1983 | Fed. Rep. of Germany | 303/22.7 |
| 334204 | 7/1903 | France | 251/286 |

Primary Examiner—Robert J. Oberleitner
Assistant Examiner—Alfred Muratori
Attorney, Agent, or Firm—Brooks Haidt Haffner & Delahunty

[57] ABSTRACT

An empty/load valve with a housing from which a reciprocable rod which actuates a changeover spool extends, and a pivotable load measuring arm mounted in offset relation to the axis of the rod and carried by a pivotable shaft. The shaft is mounted on and extends from a rigid cover secured to the housing, and the shaft is interconnected with the rod by a linkage. Most of the shaft, the rod and the linkage are covered by the cover in a dust free manner so as to protect them from dust, etc., of the ambient. Preferably, stops extend from the housing to limit the movement of the arm.

7 Claims, 2 Drawing Sheets

PROTECTIVE COVER FOR EMPLY/LOAD VALVE ACTUATOR

RELATED APPLICATIONS

This application is a continuation-in-part of copending application Ser. No. 07/452,279 now U.S. Pat. No. 5,039,174 filed Dec. 15, 1989, entitled "Empty/Load Braking System for Railroad Cars and Valve Therefor" and assigned to the assignee of this application. The disclosure of said application Ser. No. 07/452,279 is incorporated herein by reference.

FIELD OF THE INVENTION

This invention relates to the actuating mechanism for what is known in the art as an "empty/load valve" and which is used on vehicles, such as railway freight cars, to control the braking pressure on the wheels of a vehicle in accordance with the load on the vehicle.

BACKGROUND OF THE INVENTION

Empty/load valves are well known in the art. See, for example, U.S. Pat. Nos. 4,648,661; 4,826,259; 4,844,554 and 4,824,179. In general, the valve includes a reciprocable rod extending from the valve housing which actuates a changeover valve within the housing and which is actuated by pivotable measuring arm mounted on, but externally of, the valve housing. The position of the arm, and hence, the rod and the braking pressure, is determined by the load on the vehicle. Generally speaking, the length dimension of the arm and the pivot point of the arm are selected so that the length dimension of the arm intersects the axis of said rod.

One of the problems with the prior art devices is that the valves usually are located where they are subject to dust, dirt, other particulates, rust and moisture. Such foreign substances can interfere with the movement of the arm and actuation of said rod and hence, the operation of the valve.

It has been proposed to protect the rod and the arm where it engages the rod by an accordian pleated rubber boot. See, for example, U.S. Pat. No. 4,824,179. While such a boot is reasonably satisfactory when initially installed, it deteriorates relatively rapidly under the conditions of use and develops cracks or becomes torn thereby losing its effectiveness as protection for the arm and the actuating rod.

BRIEF DESCRIPTION OF THE INVENTION

In accordance with the preferred embodiment of the invention, the pivotally mounted arm which measures the load extends from a pivotable shaft mounted on bearings carried by a rigid cover secured to the valve housing. The pivotable shaft is interconnected with the reciprocable rod which operates the changeover valve by a linkage. The cover covers the end of the rod extending from the valve housing, the linkage and most of the shaft in a dust-free manner. Furthermore, the actuating arm is offset from the axis of the rod and is disposed outwardly from the valve housing so that dirt or other foreign objects cannot intervene between the arm and the housing and interfere with the movement of the arm. Preferably, stops extend outwardly from the cover to limit the pivotal movement of the arm.

BRIEF DESCRIPTION OF THE DRAWINGS

Other objects and advantages of the present invention will be apparent from the following detailed description of the presently preferred embodiments thereof, which description should be considered in conjunction with the accompanying drawings in which.

DETAILED DESCRIPTION OF THE PREFERRED EMBODIMENTS OF THE INVENTION

Figure 1:
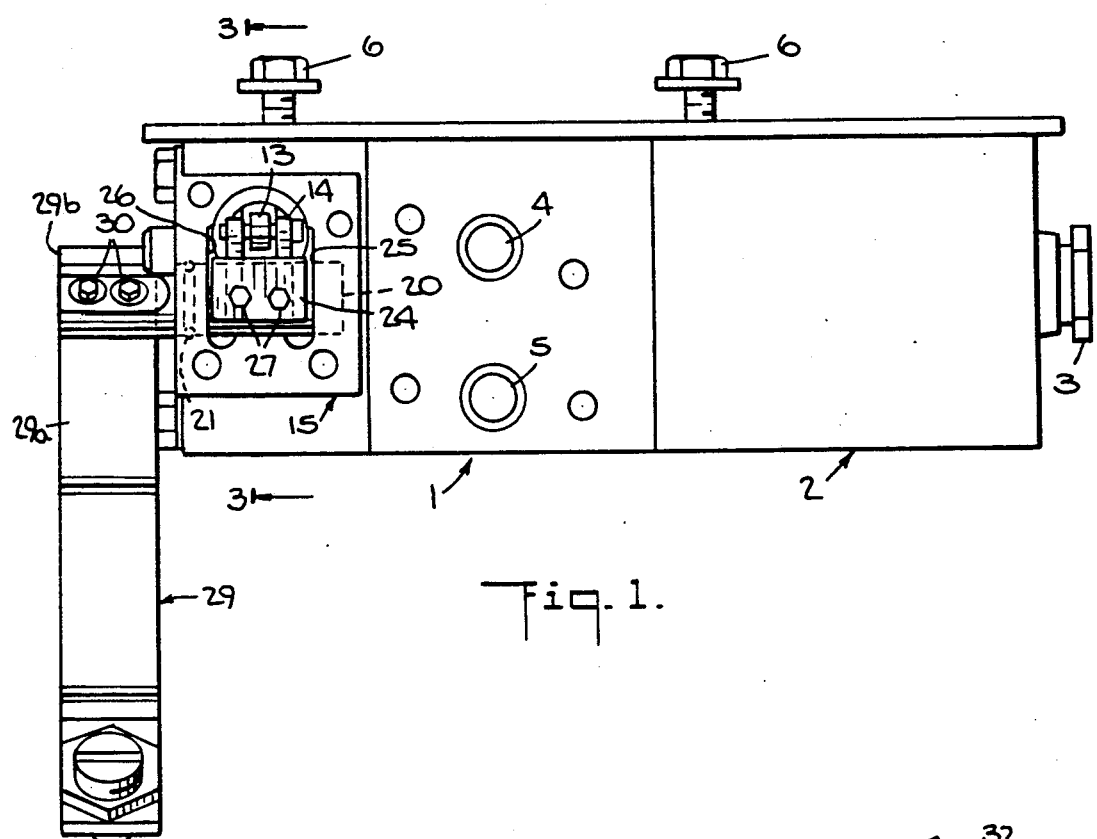
FIG. 1 is a plan view of an empty/load valve modified in accordance with the invention and with the cap forming part of the cover removed.

Although the invention has application to other empty/load valves, the invention will be described in connection with the empty/load valve shown and described in said application Ser. No. 07/452,279.

The empty/load valve illustrated in FIGS. 1-4 comprises a housing 1 with a tank or canister 2 for receiving air from the housing 1 in a known manner. The tank 2 has an indicator 3 thereon for indicating the pressure of the air in the tank 2.

The housing 1 has an air port 5 for supplying air to a brake cylinder, such as by way of a hose (not shown) and an air port 4 for receiving braking air under a pressure above atmospheric pressure from a conventional source. The housing 1 is secured to a support in a conventional manner such as by bolts 6.

Figure 3:
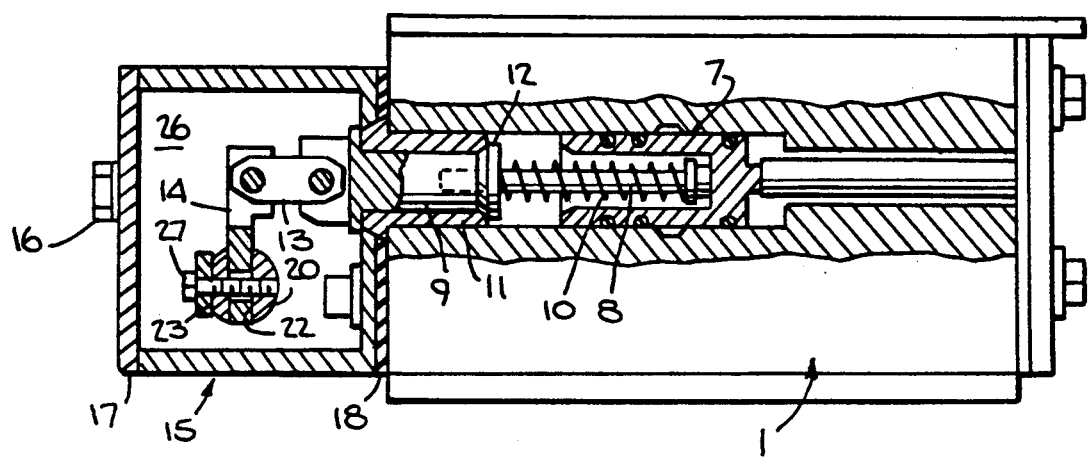
FIGS. 3 and 4 are side elevation views, partly in cross-section, taken along the line 3—3 indicated in FIG. 1 with the measuring arm omitted amd respectively show the normal positions of the parts and the positions of the parts when a car is empty.
Figure 4:
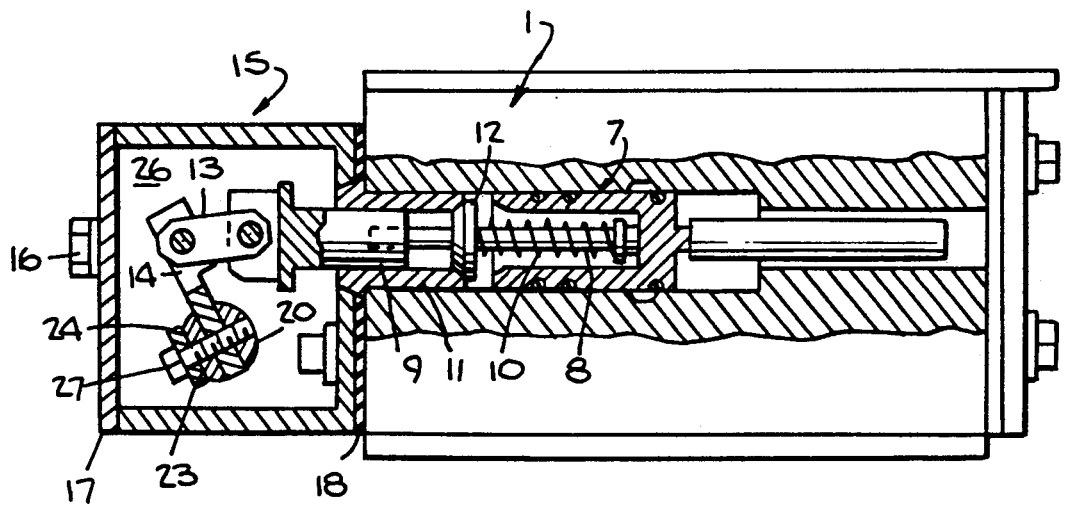

The valve mechanisms and air passageways within the housing 1 for controlling the pressure of the air supplied to a brake cylinder may be of any conventional type, but the valve illustrated in the drawings is of the type described in said application Ser. No. 07/452,279 and operates in the manner described therein. As described therein, the housing 1 contains a changeover spool 7 (see FIGS. 3 and 4) which is positioned in accordance with load on a car and which causes the braking air pressure supplied to the brake cylinder to be high when the car load is high and to be lower when the car is empty. FIGS. 3 and 4 respectively show the positions of the spool 7 and the associated parts after braking air is supplied and when the car load is high and when the car is empty.

The control means for the spool 7 comprises a shoulder screw rod 8 threaded into a piston 9 and encircled by a spring 10 which bears against the shoulder of the screw 8 and against a washer 12. The spring 10 normally maintains the parts in the positions shown in FIG. 3. The piston 9 is, in effect, an extension of the rod 8 and is slidably received in a sleeve 11 secured to the housing 1. The head of the piston 9 is pivotally connected to a link 13, and the opposite end of the link 13 is pivotally connected to a yoke or hinge 14.

A rigid cover 15, e.g. made of aluminum or steel, or other rigid material which can withstand the operating conditions, is secured to the housing 1, such as by bolts 16, and includes a cap 17 (see FIGS. 2, 3 and 4) which is held against the cover 15 by the bolts 16. A sealing gasket 18 is interposed, between the main body of the cover 15 and the housing 1 and if desired, may be interposed between the cap 17 and the main body.

Figure 2:
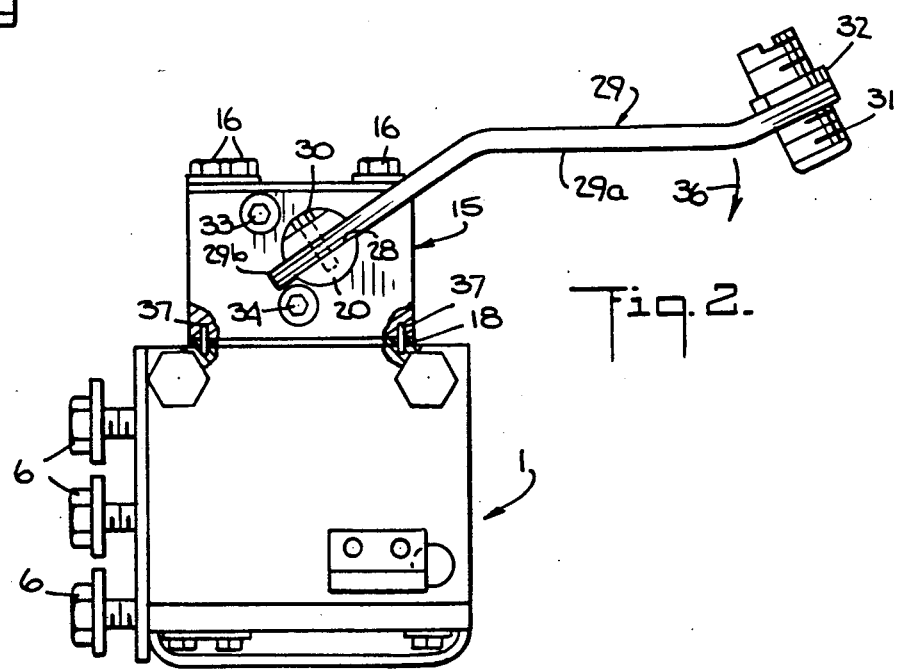
FIG. 2 is a side elevation view of the embodiment shown in FIG. 1 with the cap in place.

Preferably, the main body of the cover 15 and the housing 1 have holes therein for receiving four roll pins 37 (only two of which are shown in FIG. 2) for the purpose of properly aligning the main body with the housing 1.

A shaft 20 is pivotally mounted on the cover 15 and is encircled near the end which extends from the cover 15 by an O-ring 21 (FIG. 1) to seal it with respect to entrance of moisture, etc. into the interior of the cover 15. The opposite end of the shaft 20 is received in a blind hole in the wall 25 of the cover 15. Although the yoke or hinge 14 may be otherwise secured to the shaft 20, the portion of the shaft 20 internally of the cover 15 has an axial slot 22 (see FIGS. 3 and 4) which receives the yoke or hinge 14 The shaft 20 also has a flat portion 23 against which a spacer 24 made, for example, of Delrin, bears The spacer 24 is engageable with the walls 25 and 26 of the cover 15 to maintain the proper axial position of the shaft 20. The spacer 24 and the yoke 14 are secured to the shaft 20 by bolts 27.

Although a measuring arm 29 may be otherwise secured to the shaft 20, the portion of the shaft 20 which extends externally of the cover 15 also has a slot 28 which receives the measuring arm 29 which is held by bolts 30. The length of the arm 29 extends transversely to the pivot axis of the shaft 20 and portions 29a and 29b of the arm 29 extend outwardly, on opposite sides, of the shaft 20. The longer portion 29a has, at the free end thereof remote from the shaft 20, a contact screw 31, e.g. of nylon, threaded into a tapped hole on the portion 29a. A jam nut 32 is used to prevent rotation of the screw 31 after it has been adjusted to the position in which it properly contacts the portion of the car which varies in position with respect to the housing 1 in accordance with the load on the car.

The shorter portion 29b of the measuring arm 29 is engageable with a pair of stops 33 and 34 which can be bolts screwed into the cover 15 and which extend into the path of movement of the portion 29b to limit the movement of the measuring arm 29. Since the stops 33 and 34 are relatively small, it is unlikely that any foreign matter or objects of significant size will become lodged thereon and interfere with the proper movement of the measuring arm 29.

It will be observed that the measuring arm 29 is displaced in the direction of the pivot axis of the shaft 20 from the housing 1 and does not overlie the control means for the changeover spool 7. Since the measuring arm 29 is so displaced, interfering matter or objects cannot intervene between the arm 29 and the housing 1 and prevent proper movement of the arm 29.

In addition, it will be observed that the control means for the spool 7 and all the movable parts which actuate it, except for a small portion of the shaft 20 and for the measuring arm 29, are covered and protected in a dust-free manner by a long lasting, rigid cover 15.

FIG. 3 illustrates the normal positions of the parts before braking air is supplied to the air port 4. When braking air is supplied to the port 4, the spool 7 is urged to the left as viewed in FIG. 3, and by way of the screw 8, the piston 9, the link 13 and the yoke 14 urges the shaft 20 counterclockwise, as viewed in FIG. 3, which, in turn, urges the measuring arm 29 in the direction of the arrow 36 in FIG. 2. If the car is heavily loaded, there will be little, if any, movement of the arm 29, and hence, of the spool 7, and full braking air pressure will be supplied to the brake cylinder by way of the air outlet 5.

On the other hand, if the car is empty, the arm 29 will move in the direction of the arrow 36 permitting the shaft 20 to partially rotate around its axis and permitting the parts, including the spool 7, to assume the positions shown in FIG. 4. When this occurs, the braking air pressure at the air outlet 5 will be reduced, and the braking pressure applied to the car or truck brakes will be reduced.

Although preferred embodiments of the present invention have been described and illustrated, it will be apparent to those skilled in the art that various modifications may be made without departing from the principles of the invention.

We claim:

1. In an empty/load valve having a housing, said housing comprising a first air port for receiving air under pressure above atmospheric pressure and a second air port outlet for supplying air to a brake cylinder, air received at said first air port being supplied to said second air port outlet, a control valve within said housing for controlling the pressure of the air supplied to said second air port outlet and control means mounted on the within said housing for operating said control valve, the improvement comprising:

a rigid cover mounted on said housing in dust-free relation thereto, said cover overlying said control means;

a pivotable shaft pivotally mounted on said cover with at least a first portion thereof within said cover and a second portion thereof externally of said cover and having a pivot axis;

a relatively long and narrow load measuring arm mounted on said second portion of said shaft externally of said cover and with its length extending transversely to said pivot axis; and interconnecting means within said cover and interconnecting said shaft and said control means for causing movement of said control means with pivoting of said shaft, said interconnecting means comprising a linkage pivotally secured to said shaft and said control means whereby movement of said control means in either of two directions causes pivoting of said shaft.

2. An empty/load valve as set forth in claim 1 wherein said control means comprises a piston secured thereto and said linkage comprises a yoke within said cover secured to said first portion of said shaft and a link interconnecting said yoke and said piston, said link being pivotally secured at one end to said yoke and being pivotally secured at its opposite end to said piston.

3. An empty/load valve as set forth in claim 1 wherein said measuring arm has first and second portions extending oppositely and outwardly from said second portion of said shaft, said first of said portions of said measuring arm having an end remote from said shaft and said second of said portions of said measuring arm moving in a predetermined path with pivoting of said pivotable shaft and further comprising a contact screw mount at said end of said first of said portions of said measuring arm and a pair of stops extending outwardly from said cover, being spaced in the direction of said predetermined path and extending into said predetermined path for engagement with said second of said portions of said measuring arm for limiting movement of said measuring arm round said pivot axis, one of said stops limiting movement of said measuring arm in one direction around said pivot axis and the other of said stops limiting movement of said measuring arm in the direction opposite to said one direction.

4. An empty/load valve as set forth in claim 1 wherein said control means comprises a reciprocable rod spaced from said pivot axis and reciprocable in a direction transverse to said pivot axis and said measuring arm is mounted with its said length spaced from said reciprocable rod in the direction of said pivot axis.

5. In an empty/load valve having a housing, said housing comprising a first air port for receiving air under pressure above atmospheric pressure and a second air port outlet for supplying air to a brake cylinder, air received at said first air port being supplied to said second air port outlet, a control valve within said housing for controlling the pressure of the air supplied to said second air port outlet and control means mounted on and within said housing for operating said control valve, the improvement comprising:

- a rigid cover mounted on said housing in dust-free relation thereto, said cover overlying said control means;
- a pivotable shaft pivotally mounted on said cover with at least a first portion thereof within said cover and a second portion thereof externally of said cover and having a pivot axis; said cover having a pair of spaced side walls extending transversely to said pivot axis, and a spacer mounted on and secured to said first portion of said shaft and engageable with said side walls for maintaining said shaft in a predetermined axial position;
- a relatively long and narrow load measuring arm mounted on said second portion of said shaft and with its length extending transversely to said pivot axis; and
- interconnecting means within said cover and interconnecting said shaft and said control means for causing movement of said control means with pivoting of said shaft.

6. An empty/load valve as set forth in claim 5 wherein said first portion of said shaft has an axial slot and said linkage comprises a yoke with a portion thereof within said slot.

7. An empty/load valve as set forth in claim 6 wherein said first portion of said shaft has a flat portion radially outwardly of said slot and wherein said spacer is disposed in engagement with said flat portion.

* * * * *

UNITED STATES PATENT AND TRADEMARK OFFICE
CERTIFICATE OF CORRECTION

PATENT NO. : 5,192,119
DATED : March 9, 1993
INVENTOR(S) : Shepherd et al

It is certified that error appears in the above-identified patent and that said Letters Patent is hereby corrected as shown below:

Col. 2, line 15, "the" should be deleted;

Col. 4, line 22, "the" should read --and--.

Signed and Sealed this

Thirtieth Day of November, 1993

*Attest:*

BRUCE LEHMAN

*Attesting Officer*   Commissioner of Patents and Trademarks